United States Patent
Lee et al.

(10) Patent No.: US 7,802,894 B2
(45) Date of Patent: Sep. 28, 2010

(54) DIRECT TYPE BACK LIGHT UNIT FOR LIQUID CRYSTAL DISPLAY DEVICE

(75) Inventors: Man Hoan Lee, Kumi-shi (KR); Sung Keun Lee, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/314,338

(22) Filed: Dec. 8, 2008

(65) Prior Publication Data

US 2009/0097232 A1   Apr. 16, 2009

Related U.S. Application Data

(62) Division of application No. 11/119,916, filed on May 3, 2005, now Pat. No. 7,473,009.

(30) Foreign Application Priority Data

Dec. 28, 2004   (KR) .............................. 2004-113793

(51) Int. Cl.
*G09F 13/04* (2006.01)

(52) U.S. Cl. .................. 362/97.2; 362/84; 362/217.08; 362/260; 313/485; 313/493; 349/64; 349/70; 359/15

(58) Field of Classification Search ................. 313/485, 313/493; 349/64, 70; 359/15, 599; 362/30, 362/84, 97.2, 217.08, 260, 355
See application file for complete search history.

(56) References Cited

U.S. PATENT DOCUMENTS

| | | | |
|---|---|---|---|
| 5,418,631 A * | 5/1995 | Tedesco | ........................ 359/15 |
| 5,461,279 A | 10/1995 | Hasegawa | |
| 5,471,327 A | 11/1995 | Tedesco et al. | |
| 7,473,009 B2 * | 1/2009 | Lee et al. | ..................... 362/260 |
| 2005/0218810 A1 | 10/2005 | Kwok et al. | |

* cited by examiner

*Primary Examiner*—Stephen F Husar
(74) *Attorney, Agent, or Firm*—McKenna Long & Aldridge

(57) ABSTRACT

A back light unit for a liquid crystal display device for improving uniformity of the light and dispensing with optical sheets. The back light unit includes a light source having a holographic pattern formed on a surface thereof opposite the display device which is to display a picture, and a reflective plate under the light source.

6 Claims, 6 Drawing Sheets

DIRECT TYPE BACK LIGHT UNIT FOR LIQUID CRYSTAL DISPLAY DEVICE

CROSS-REFERENCE TO RELATED APPLICATION

This application is a divisional of prior Ser. No. 11/119,916, now U.S. Pat. No. 7,473,009 filed May 3, 2005, and claims the benefit of Korean Patent Application No. P2004-113793, filed on Dec. 28, 2004, which is hereby incorporated by reference for all purposes as if fully set forth herein.

BACKGROUND OF THE INVENTION

1. Field of the Invention

The present invention relates to back light units for a liquid crystal display devices. More particularly, the present invention relates to a back light unit having a holographic pattern layer.

2. Discussion of the Related Art

Active research has been conducted relating to flat display devices. The research has been most focused on Liquid Crystal Display Devices (LCDs), Field Emission Display Devices (FEDs), Electro-luminescence Display Devices (ELDs), and Plasma Display Panels (PDP). Of the flat display devices, a field of application for liquid crystal display devices expands to notebook PCs, desk top monitors, and liquid crystal TVs including features such as high contrast ratio, suitability for expression of gray scales and motion pictures, and low power consumption.

However, because the liquid crystal display device is not luminous, the liquid crystal display device requires an external light source for emitting a light. Particularly, in a case of a transmissive liquid crystal display device, a separate illuminating device for emitting and guiding the light to a back surface of the LCD panel, i.e., a back light unit, is required, invariably.

Back light units include an edge type and direct type based upon the methods of projecting the light. The edge type back light unit has a tube-type linear light source, such as a lamp light, at a side of the liquid crystal panel, to project the light from the lamp light to the liquid crystal panel throughout an entire surface thereof. The direct type back light unit has lamp lights selectively mounted under the liquid crystal panel to distribute the light from the lamp lights to the liquid crystal panel throughout an entire surface thereof, by diffusing the light by means of a diffusion sheet located between the lamp lights and the liquid crystal panel.

Since no light plate is required, the direct type back light unit is advantageous in that the direct type back light unit is suitable for fabrication of a thin, and light weight liquid crystal display device that provides a high luminance and uniform light distribution.

A related art direct type back light will be described with reference to the attached drawings.

FIG. 1 illustrates an exploded perspective view of a related art direct type back light unit, and FIG. 2 illustrates a section across I-I' of FIG. 1, and FIGS. 3A and 3B illustrate SEM photographs of diffusion sheets.

A liquid crystal display device having the back light unit as a basic element will be described.

Generally, the liquid crystal display device includes a liquid crystal panel having opposite upper and lower substrates bonded together with a liquid crystal layer inbetween, polarizing plates respectively attached to upper, and lower surfaces of the liquid crystal panel for transmitting light of only one direction, a direct type back light mounted under the liquid crystal panel for providing a light to the liquid crystal panel, a case for covering an outside surface of the back light unit to support the liquid crystal panel and the direct type back light unit, and a bezel part of stainless steel attached to an outside of the case for covering a circumference of the liquid crystal panel except an effective area where a picture is to be displayed thereon.

In FIGS. 1 and 2, the direct type back light is provided with a lamp light 111 for providing a light, and on optical sheet having a diffusion sheet 115, a prism sheet 116, and a protective sheet 117 between the light lamp 111 and the liquid crystal panel 110.

In general, there is a reflective plate (not shown) under the light lamp 111 for directing the light from the light lamp 111 toward the display portion of the liquid crystal panel.

The lamp light 111 may be a flat lamp light or a Cold Cathode Fluorescent Lamp (CCFL).

The flat lamp light has a discharge space formed by upper and lower boards sealed with a gap therebetween with discharge gas, such as neon Ne, argon Ar, or mercury Hg filled therein, a fluorescent material layer coated on each of opposite inside wall surfaces of the upper and lower boards, and an electrode formed on the lower board for applying power thereto.

Since a certain space, and adequate optical sheets are required between the lamp light and the liquid crystal panel for preventing a shape of the lamp light from being visible on a screen, use of the CCFL imposes a limitation on fabrication of a thin liquid crystal display device. Therefore, in a case when a light source with a comparatively large display area and a uniform luminance is required, the flat lamp light will be more suitable, of which an entire surface opposite to a display face of the liquid crystal panel is luminous.

The diffusion sheet 115, the prism sheet 116, and the protective sheet 117 are collectively called the optical sheet. There are a plurality of optical sheets between the light lamp 111 and the liquid crystal panel 110 to enhance a light diffusing effect to prevent the shape of the light lamp from being visible on the display surface of the liquid crystal panel and provide a light having a uniform luminance distribution throughout the surface.

In detail, the diffusion sheet 115 uniformly diffuses the light from the lamp light, the prism sheet 116, with a plurality of triangular linear prisms, collects the diffused light, and directs the light toward the liquid crystal panel, and the protective sheet 117 on the prism sheet 116 protects the prism sheet 116. As shown in FIGS. 3 and 4, the diffusion sheet 115 has spherical light diffusing fine particles 115a on a surface for diffusing the light by differences of refractive indices.

As the light diffusing fine particles 115a, glass, polystyrene, polycarbonate, PMMA, or so on is used, which makes a light transmits, and refracts, to change a light path, and diffuse the light. The prism sheet 116 has spherical or non-spherical lenses added to a prism sheet which can collect a diffused light, for collimating the light within a predetermined angle for improving a luminance.

However, the placing of various kinds of optical sheets between the liquid crystal panel and the lamp light impairs an optical efficiency as a portion of the light from the lamp is absorbed in the optical sheets as the light passes through the optical sheets, the stacking and light combination of various kinds of optical sheets may cause a defect in view of fabrication process, and the increased thickness of the sheets is contrary to development of a thin liquid crystal display device which consumers require.

SUMMARY OF THE INVENTION

Accordingly, the present invention is directed to a direct type back light unit for a liquid crystal display device that substantially obviates one or more problems due to limitations and disadvantages of the related art.

An advantage of the present invention is to provide a back light unit for a liquid crystal display device in which a holographic pattern that changes the direction and distribution of a light is formed on a lamp light to improve uniformity of the light, reduces or removes the need for optical sheets to fabricate a thin liquid crystal display device.

Additional advantages and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these and other advantages and in accordance with the purpose of the invention, as embodied and broadly described herein, a back light unit for a liquid crystal display device includes a light source and a holographic pattern on a light path of a light from the light source.

The holographic pattern controls the direction and distribution of the light incident thereon.

For example, the light source may be a flat lamp light, and the holographic pattern may be formed on a surface of one side of the flat lamp light, or the holographic pattern may be positioned between the flat lamp light and the liquid crystal panel.

The light source includes a plurality of CCFLs, and a glass board on the plurality of CCFLs. The holographic pattern is formed on the surface of the glass board.

The holographic pattern is formed by casting glass in a mold having a holographic image recorded thereon, or by applying an optical refractive material on an upper surface of the flat light lamp, and directing a laser beam thereto.

The back light may be a direct type or of an edge type.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 1:
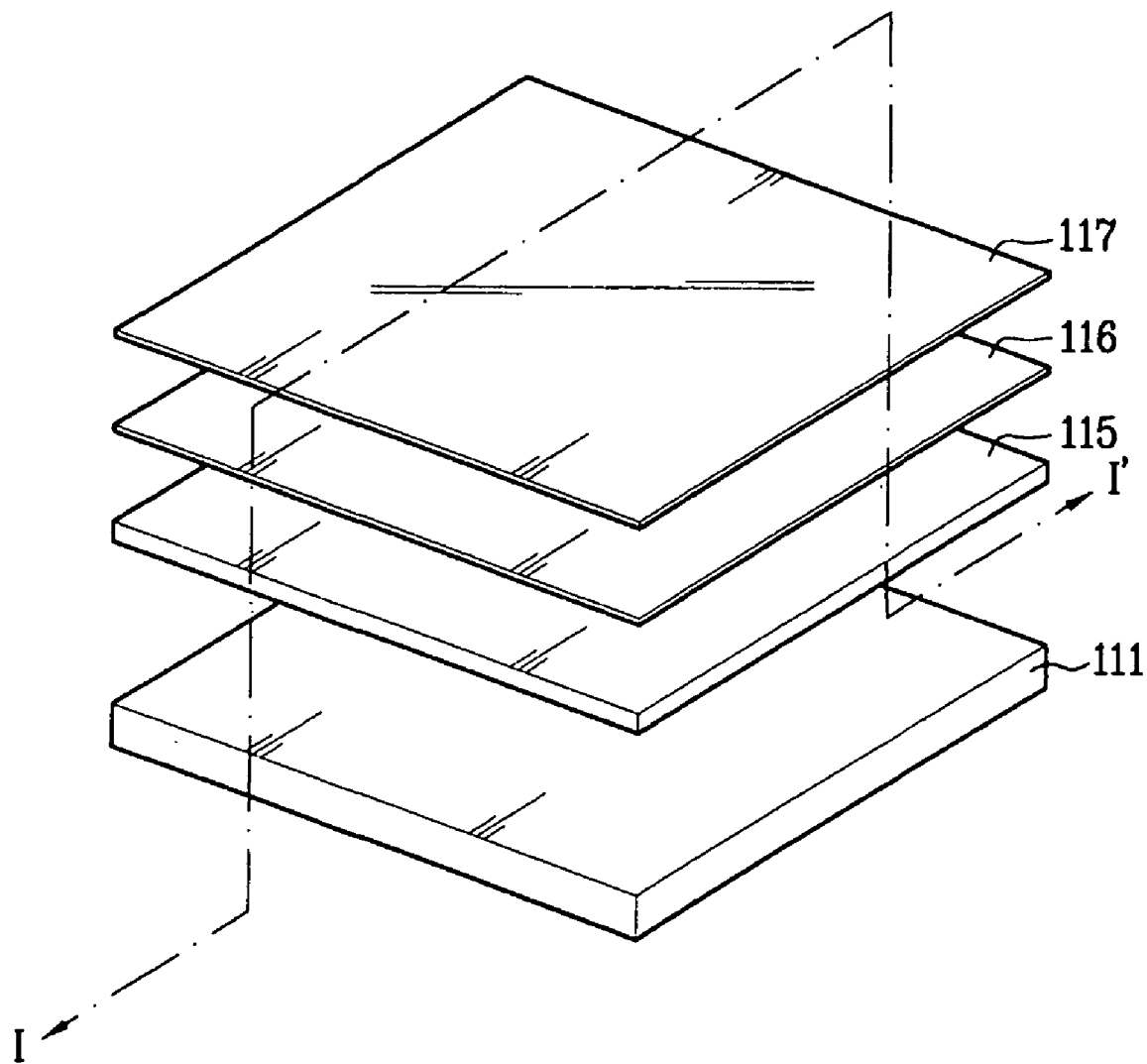
FIG. 1 illustrates a perspective view of a related art direct type back light unit.
Figure 2:
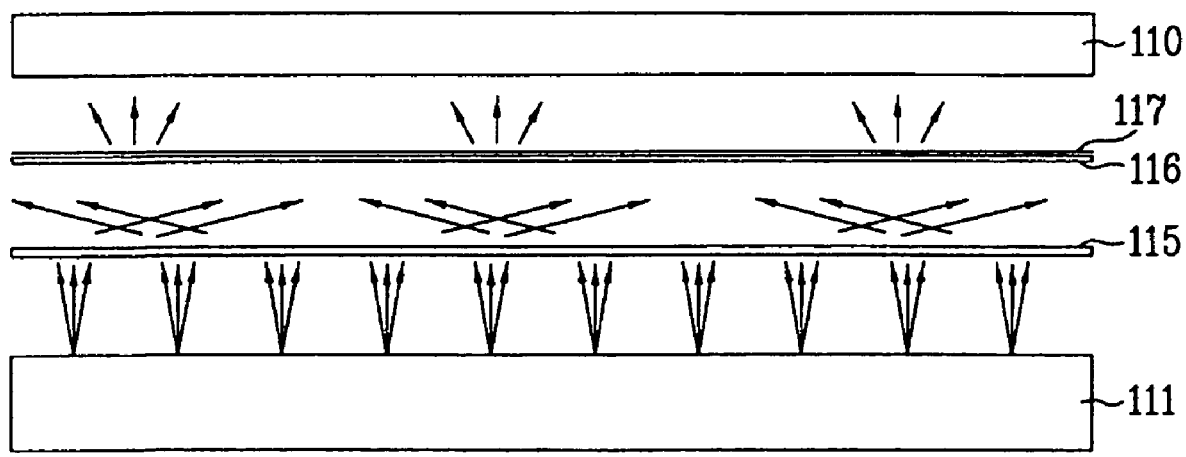
FIG. 2 illustrates a section across a line I-I' in FIG. 1.
Figure 3A:
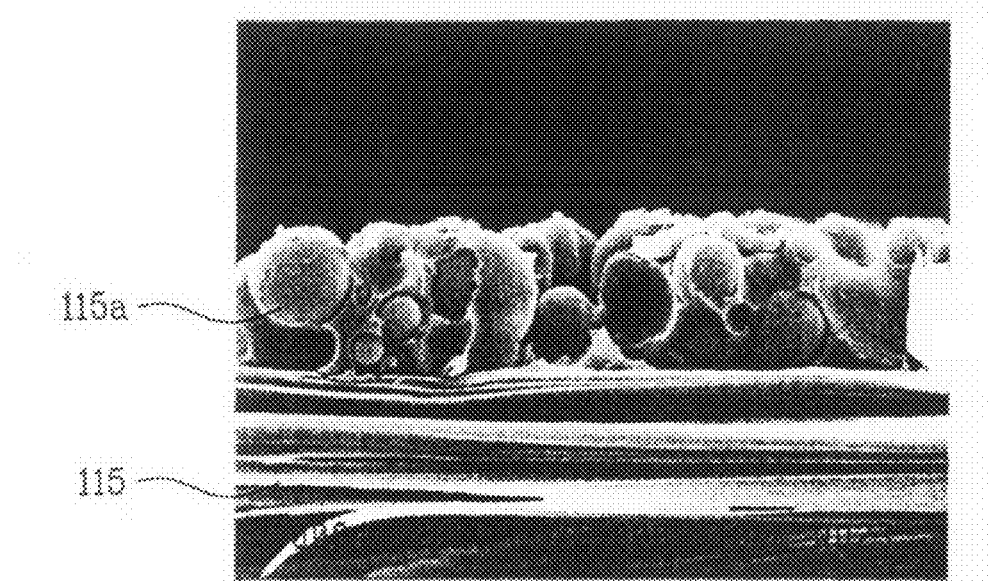
FIGS. 3A and 3B illustrate SEM photographs of diffusion sheets, respectively.
Figure 3B:
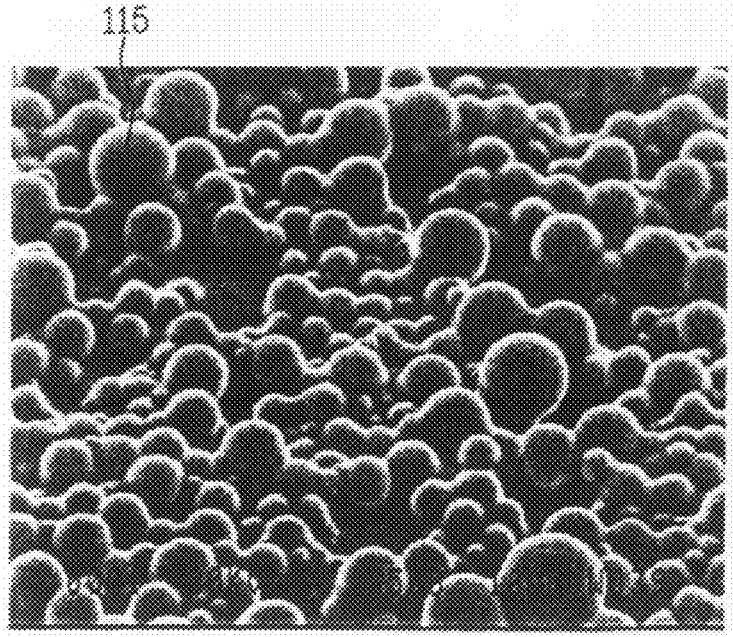
Figure 4:
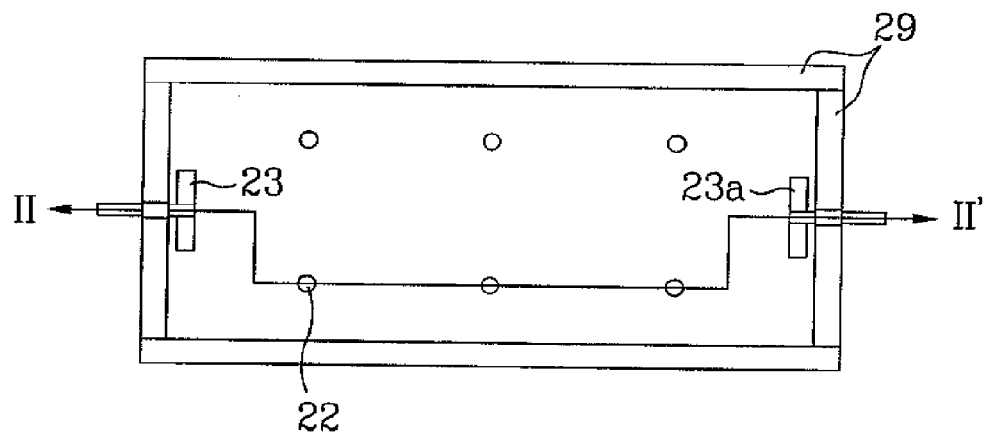
FIG. 4 illustrates a plan view of the direct type back light in accordance with an embodiment of the present invention.
Figure 5:
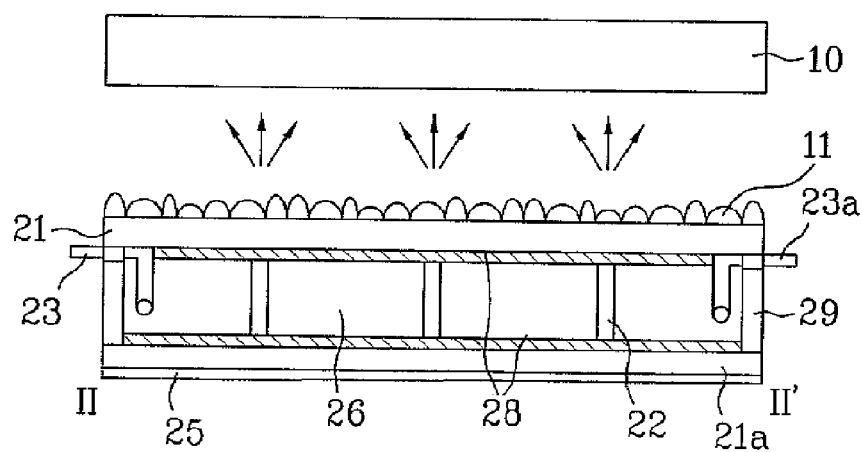
FIG. 5 illustrates a section across a line II-II' in FIG. 4.
Figure 6A:
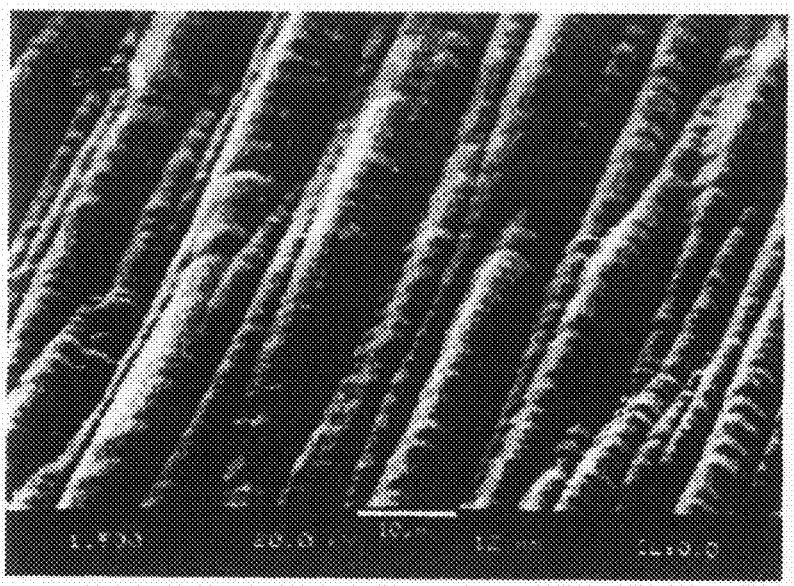
FIGS. 6A and 6B illustrate SEM photographs of holographic pattern in accordance with a preferred embodiment of the present invention, respectively.
Figure 6B:
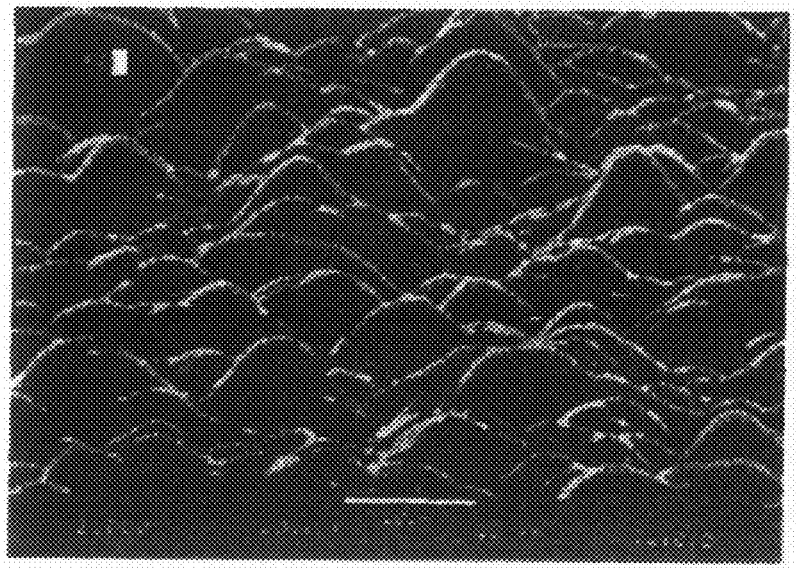

FIG. 4 illustrates a plan view of a direct type back light in accordance with an embodiment of the present invention, FIG. 5 illustrates a section across a line II-II' in FIG. 4, and FIGS. 6A and 6B illustrate SEM photographs of holographic patterns in accordance with an embodiment of the present invention, respectively.

In FIGS. 4 and 5, the direct type back light flat lamp light includes an upper board 21 having a holographic pattern 11 formed on an outside surface, a lower board 21a opposite the upper board 21 with a gap therebetween, side boards 29 each placed between edges of the upper and lower boards 21 and 21a, respectively, to seal the upper and lower boards 21 and 21a, supporting rods 22 between the upper board 21 and the lower board 21a for supporting the upper board 21, at least one first electrode 23 inserted in the side board 29, and at least one second electrode 23a opposite the first electrode 23.

The space between the upper and lower boards 21 and 21a are sealed with the side boards 29 to form a discharge space 26 having discharge gas, such as neon Ne, argon Ar or mercury Hg filled therein.

The first electrode 23 and the second electrode 23a are completely sealed to the side boards 29 with a bonding material, and have ends connected to power leading lines (not shown), for applying an external voltage thereto.

In order to prevent a visible light generated in the discharge space from escaping through a back surface of the lower board 21a, either a reflective plate 25 provided under the lower board 21a, or a material having a reflective property may be coated on an inside wall of the lower board 21a.

The flat lamp light generates a visible light when the discharge gas, which induces discharge if an appropriate voltage is applied to the first and second electrodes 23 and 23a, starts to discharge, i.e., electrons moving by the discharge collide with other electrons to generate an UV ray. The UV ray hits the fluorescent material layer 28 on the inside walls of the upper and lower boards 21 and 21a to excite and restore the fluorescent material to generate the visible light.

In this instance, the visible light passes through the holographic pattern 11 on the upper board 21 to diffuse and collimate at the same time. The visible light is then provided to the liquid crystal panel 10.

The holographic pattern 11 is formed to diffuse the light in a predetermined direction and angle regardless of an incident angle of the light. Therefore, a direction and distribution of the light can be controlled by using the holographic pattern 11 to collimate or diffuse the light.

That is, even if the light from the lamp light proceeds in a straight and upwardly direction, once the light passes through the holographic pattern, because the light diffuses within a range of angle with reference to a vertical axis of the holographic pattern regardless of an incident angle of the light, the direction and distribution of the light can be controlled.

Thus, since the direct type back light of the present invention diffuses as well as collimates by means of the holographic pattern, no separate optical sheets are required. However, in a case of a large sized liquid crystal display, optical sheets may be used to provide a more uniform light; thus, the number of the optical sheets can be reduced to a minimum.

In general, the upper board 21 of the flat lamp light is constructed of a transparent, heat resistant material board, for example, glass. The holographic pattern is formed by casting the transparent material board in a mold having a holographic image formed therein to pattern the holographic image on the transparent board.

In order to form the holographic image in the mold, a method of exposing photoresist having a fine holographic lattice, a method of direct carving with a laser beam or an e-beam, a dry etching method, a diamond turning method, or so on is used.

In FIGS. 6A and 6B, the holographic pattern formed using one of the above methods has semi-spherical shapes of a variety of sizes and shapes of irregular patterns to enable diffusing and collimating of the light in various directions. Therefore, by controlling shapes and sizes of the holographic patterns, a direction and a distribution of the light can be controlled.

As an example, a small pattern used between large patterns may transmit and refract a light passing between the large patterns to enhance a light transmission efficiency, as well as improve a light diffusing function in order to obtain a uniform light source.

For reference, the collimating and diffusing of the light occurs by refraction of the light based upon refractive indices of media. If the light is incident on a boundary surface of two media slanted with respect to the boundary surface, the light refracts to a direction vertical to the boundary surface if the refractive index of the second medium is great. The light can be collimated or diffused by this principle.

Figure 7:
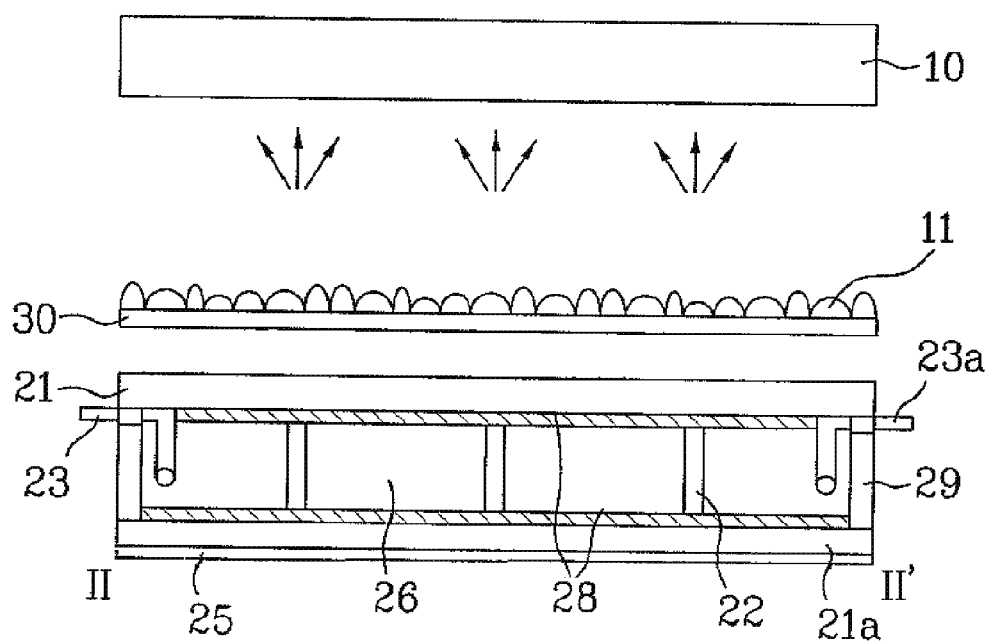
FIG. 7 illustrates a section view of the direct type back light in accordance with another embodiment of the present invention.

In another embodiment of the present invention shown in FIG. 7, the holographic pattern 11 may not be formed on the upper surface of the flat lamp light directly. Instead, as shown in FIG. 7, a holographic diffusion sheet 30, having the holographic pattern 11, formed and placed between the flat lamp light and the liquid crystal panel 10.

In another embodiment of the present invention, an optical refractive material, such as dichromate gelatin, photoresist, photopolymer, silver halide, or so on may be coated on the upper surface of the lamp light, and a laser beam may be directed thereon to form an interference pattern of a speckle shape in order to form the holographic pattern. Since the smaller the speckle shaped interference pattern, the more the light transmitting through the holographic pattern diffuses, and the greater the range of diffusing angle of the light, the light distribution and the like can be controlled by controlling a size of the holographic pattern.

In another embodiment of the present invention, instead of the flat lamp light, a plurality of CCFLs or EEFLs may be used as the light source. In this case, a transparent board, for example a glass board, may be placed on the plurality of CCFLs or EEFLs and a holographic pattern is formed on the glass board.

As has been described, the back light unit for a liquid crystal display device of the present invention has the following advantages.

First, control of light distribution and the like by means of a holographic pattern on a surface of a lamp light opposite to a liquid crystal panel permits improve light uniformity.

Second, collimating and diffusing of a light by means of a holographic pattern permits one to dispense with, or reduce a number of optical sheets, which permits the fabrication of a thinner liquid crystal display device.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A back light unit for a liquid crystal display device comprising:
   a flat lamp light; and
   a holographic pattern is positioned between the flat lamp light and a liquid crystal panel, wherein the holographic pattern controls a direction and distribution of the light incident thereon and wherein the holographic pattern is formed by casting a transparent material in a mold having a holographic image recorded thereon.

2. The back light unit according to claim 1, wherein the holographic pattern is formed on a diffusion sheet between the flat lamp light and the liquid crystal panel.

3. The back light unit according to claim 1, wherein the flat lamp light includes:
   an upper board;
   a lower board opposite the upper board and spaced from the upper board;
   side boards between edges of the upper and lower boards to seal the upper and lower boards;
   first and second electrodes inserted in the side boards and positioned opposite each other;
   a fluorescent material layer on an inside wall of the upper and lower boards;
   a discharge gas in the space between the upper and lower boards; and
   a reflective plate on one side of the lower board.

4. A method of forming a liquid crystal display device, the method comprising:
   providing a flat lamp light; and
   providing a holographic pattern between the flat lamp light and a liquid crystal panel, wherein the holographic pattern controls a direction and distribution of the light incident thereon and wherein the holographic pattern is formed by casting a transparent material in a mold having a holographic image recorded thereon.

5. The method according to claim 4, wherein the holographic pattern is formed on a diffusion sheet between the flat lamp light and the liquid crystal panel.

6. The method according to claim 4, wherein the flat lamp light includes:
   an upper board;
   a lower board opposite the upper board and spaced from the upper board;
   side boards between edges of the upper and lower boards to seal the upper and lower boards;
   first and second electrodes inserted in the side boards and positioned opposite each other;
   a fluorescent material layer on an inside wall of the upper and lower boards;
   a discharge gas in the space between the upper and lower boards; and
   a reflective plate on one side of the lower board.

* * * * *